Dec. 2, 1958       E. W. MILLER       2,862,341
SOIL LEVELER WITH ADJUSTABLE WHEELED FRAME
Filed April 1, 1957

INVENTOR
Earl W. Miller.

BY
ATTORNEY

United States Patent Office 2,862,341
Patented Dec. 2, 1958

2,862,341
SOIL LEVELER WITH ADJUSTABLE WHEELED FRAME

Earl W. Miller, Georgetown, Ohio

Application April 1, 1957, Serial No. 649,759

2 Claims. (Cl. 55—22)

This invention relates to a tractor-drawn soil leveler with adjustable wheeled frame.

The invention is more particularly concerned with a soil leveler adapted for use with tractors having a standard three-point hitch with automatic draft control.

A primary object of the invention is the provision of a soil leveler which is particularly characterized by a three-point hitch for connection with tractors as above referred to, and adjustable supporting casters in opposition to said hitch.

A further object of the invention is the provision of a soil leveler of an open frame-like construction embodying, as the most essential elements thereof, a plurality of tandem-arranged soil-cutting members which are disposed generally transversely of the direction of draft of the leveler.

Other objects and advantages of the invention will become apparent in the course of the following detailed description, taken in connection with the accompanying drawing, wherein—

Figure 1:
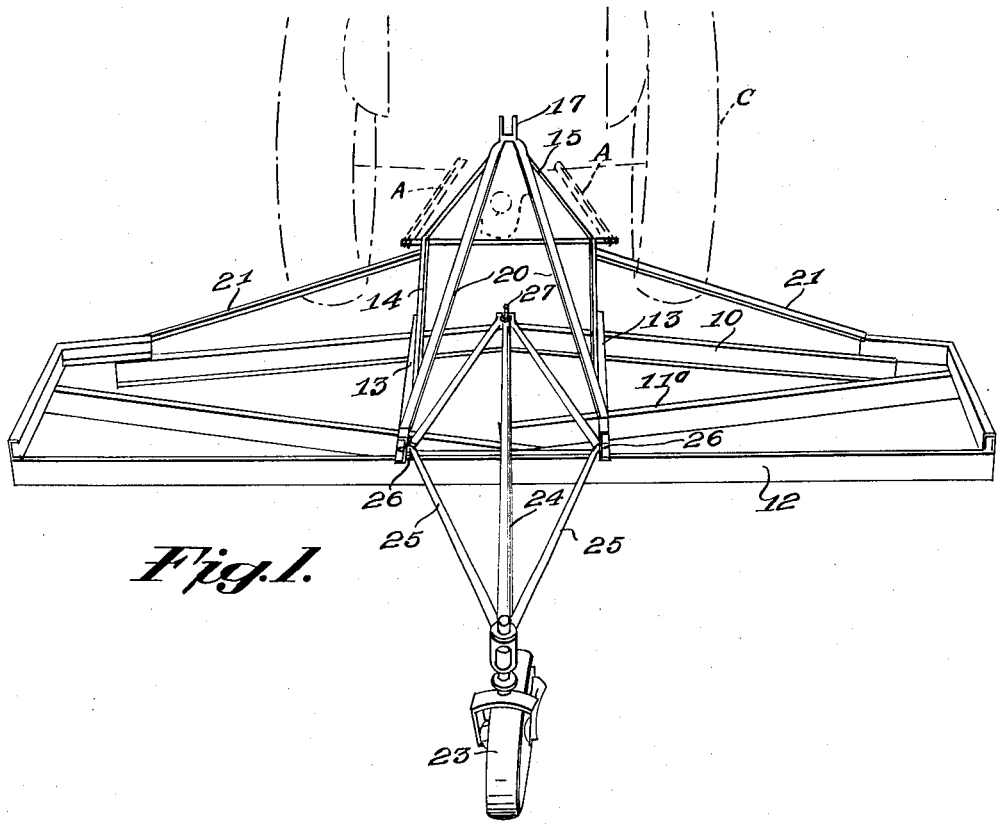
Figure 1 is a perspective view of the improved soil leveler as observed from the rear thereof and wherein the rear portion of a tractor is indicated in dot-and-dash lines.
Figure 2:
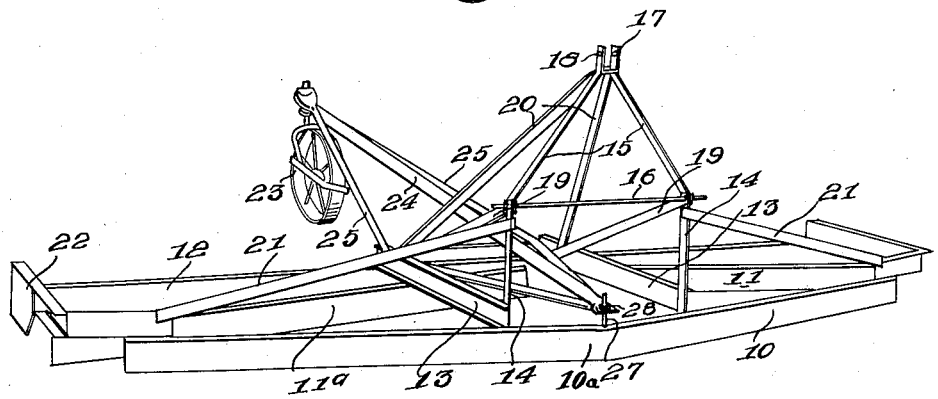
Fig. 2 is also a perspective view of the improved soil leveler as observed generally from the front thereof.

Referring now in detail to the drawing, the leveler basically includes a plurality of spaced generally transversely arranged soil-cutting beams, indicated as 10, 11, 11ª and 12. While such beams may be of any desired transverse configuration, they are preferably channel members with the bases thereof disposed in the direction of draft of the leveler.

As indicated, the advance beam 10 is of angular formation with its vertex 10ª in the vertical central plane of the leveler. The two beams 11 and 11ª are in angular relation to beam 10 as well as to each other, and preferably have their inner ends extending slightly to opposite sides of said plane, while the beam 12 is straight and at right angles to said plane.

The four beams 10, 11, 11ª and 12 are connected by a pair of beams 13 which are parallel and disposed relatively short distances on opposite sides of said plane. The said beams 10 to 13 are rigidly connected preferably by welding as are other members, later referred to.

Extending upwardly from the front ends of beams 13 are vertical supports 14, and extending upwardly from supports 14 are a pair of converging supports 15, and a horizontal hitch rod 16 extends through lapping ends of the supports 14 and 15. The upper ends of supports 15 are provided with a hitch stirrup 17 having laterally alined pivot pin apertures 18. The said supports 14 and 15 are braced at their adjacent ends by means of bars 19 connected to beams 13, and the stirrup 17 is braced by bars 20 also connected to beams 13. The said supports 14 are preferably further braced by bars 21.

The leveler further includes opposite end plates for preventing spilling of soil around the ends of beam 12.

The leveler is supported from the tractor C by a pair of arms A whose corresponding ends are pivoted on opposite ends of rod 16, and the stirrup is connected to the tractor by suitable means whereby the leveler has a three-point hitch connection with the tractor.

The leveler is rearwardly supported by a caster wheel 23 which is swively connected to the rear end of a frame comprising a generally horizontal bar 24 disposed in said plane and a pair of laterally disposed angular rods 25 rigid with the said bar. The rods 25 are pivotally connected on horizontal axes to the rear ends of beams 13, as indicated at 26, and the beam 10 at its apex 10ª is provided with a vertically disposed bolt 27 extending through an aperture in the forward end of frame 24—25, and a nut 28 is threaded on the bolt for effecting adjustment of the leveler between the three-point suspension thereof and the caster wheel 23. While a caster wheel is preferred for the rear suspension, a slide or skid may be used since it is necessary only to provide pressure on point 17 when the beams are over a low place in the ground.

The improved soil leveler is capable of construction at relatively low cost since same is made up of simple readily available stock and, due particularly to the hitch and the caster wheel suspension, same is highly efficient in operation.

While the invention has been disclosed in accordance with a single specific structural embodiment thereof, the scope is defined in the following claims.

What is claimed and desired to be secured by U. S. Letters Patent is:

1. A soil leveling apparatus comprising a substantially horizontal transversely elongated soil leveling frame, said frame including a plurality of spaced generally side-by-side soil leveling members disposed substantially at the same elevation, a pair of spaced longitudinal beams mounted upon and carrying said frame near the central portion of the frame, means secured to said beams and adapted for connection with a conventional three-point hitch of a tractor, a generally horizontal caster frame arranged above the soil leveling frame and disposed transversely thereof and extending longitudinally rearwardly of the soil leveling frame and positioned between said beams, the forward end of the caster frame being disposed near and above the forward side of the soil leveling frame, means forming a pivotal connection between the caster frame and said beams near the rear ends of the beams and intermediate the ends of the caster frame whereby the caster frame may swing vertically a limited amount relative to the soil leveling frame, a caster having swiveled connection with the rear end of the caster frame, and vertically adjustable means interconnecting the forward end of the caster frame with the forward side of the soil leveling frame.

2. A soil leveling apparatus comprising a substantially horizontal transversely elongated soil leveling frame, said frame including a plurality of spaced generally side-by-side soil leveling members disposed substantially at the same elevation, a pair of spaced longitudinal beams mounted upon and carrying said frame near the central portion of the frame, means carried by said beams for connecting the apparatus with a conventional three-point suspension tractor hitch, a generally horizontal longitudinal caster frame disposed between said beams and above the soil leveling frame and extending rearwardly of the soil leveling frame for a substantial distance, pivot elements carried by opposite sides of the caster frame and engaging said beams near the rear ends of the latter for pivoting the caster frame thereto for limited vertical swinging movement, the forward end of the caster frame extending near and above the forward side of the soil leveling frame, a caster carried by the rear end of the caster frame, an upstanding screw-threaded element secured to the forward side of the soil leveling frame, the forward end of the caster frame having an opening receiving said element, and a nut having screw-threaded engagement with said element above the forward end of the caster frame whereby such forward end is vertically adjustable relative to the soil leveling frame.

References Cited in the file of this patent

UNITED STATES PATENTS

| | | |
|---|---|---|
| 1,182,272 | Hodge | May 9, 1916 |
| 2,411,277 | Laird et al. | Nov. 19, 1946 |
| 2,510,779 | Hancock | June 6, 1950 |
| 2,646,738 | Denning | July 28, 1953 |
| 2,684,543 | Cundiff | July 27, 1954 |
| 2,722,067 | Baron | Nov. 1, 1955 |
| 2,722,876 | London | Nov. 8, 1955 |

FOREIGN PATENTS

| | | |
|---|---|---|
| 24,856 | Finland | Oct. 1, 1951 |